U S009022664B2

United States Patent
Aust et al.

(10) Patent No.: US 9,022,664 B2
(45) Date of Patent: May 5, 2015

(54) BEARING RING FOR A RADIAL ROLLING BEARING, IN PARTICULAR FOR A CYLINDRICAL ROLLER BEARING OR A NEEDLE ROLLER BEARING

(75) Inventors: Jan-Rene Aust, Erlangen (DE); Heinz Schäfers, Erlangen (DE); Matthias Fick, Schnaittach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/008,843

(22) PCT Filed: Feb. 3, 2012

(86) PCT No.: PCT/EP2012/051869
§ 371 (c)(1),
(2), (4) Date: Jan. 21, 2014

(87) PCT Pub. No.: WO2012/150049
PCT Pub. Date: Nov. 8, 2012

(65) Prior Publication Data
US 2014/0147070 A1      May 29, 2014

(30) Foreign Application Priority Data

May 3, 2011   (DE) .......................... 10 2011 075 157

(51) Int. Cl.
*F16C 33/60*   (2006.01)
*F16C 19/46*   (2006.01)

(52) U.S. Cl.
CPC ................. *F16C 33/60* (2013.01); *F16C 19/46* (2013.01); *F16C 33/605* (2013.01)

(58) Field of Classification Search
USPC ................................... 384/559, 561, 564, 569
See application file for complete search history.

(56) References Cited

U.S. PATENT DOCUMENTS

| 1,738,984 | A | * | 12/1929 | Brown | 384/559 |
| 2,065,475 | A | * | 12/1936 | Robinson | 384/559 |
| 2,094,252 | A | * | 9/1937 | Young | 384/561 |
| 2,166,673 | A | * | 7/1939 | Barr | 384/561 |
| 3,666,334 | A | * | 5/1972 | Sengalliesi | 384/559 |

(Continued)

FOREIGN PATENT DOCUMENTS

| DE | 1 818 278 U | 9/1960 |
| DE | 6 80 0671 U | 1/1969 |

(Continued)

*Primary Examiner* — Thomas R. Hannon
(74) *Attorney, Agent, or Firm* — Fitzpatrick, Cella, Harper & Scinto

(57) ABSTRACT

A bearing ring for a radial rolling bearing, in particular for a cylindrical roller bearing or needle bearing which has, on one of the radial surface areas thereof, a track for a set of cylindrical rolling bodies which are cageless or are guided by a cage and one or two guide flanges axially bounding the track of the rolling bodies is/are fastened to the axial end surfaces of said bearing by adhesive bonding. Each guide flange has a rectangular profile cross section with a horizontal fastening limb and a vertical flange limb and, by way of the horizontal fastening limb thereof, is adhesively bonded in an encircling axial groove in an axial end surface of the bearing ring. The width of each axial groove is greater than the material thickness of each fastening limb, and each guide flange can be fixed radially in position in the particular axial groove of a profiling of the fastening limb of said guide flange, the profiling being in contact both with the outer wall and with the inner wall of the associated axial groove.

15 Claims, 1 Drawing Sheet

(56) References Cited

U.S. PATENT DOCUMENTS

| | | | | |
|---|---|---|---|---|
| 4,162,109 A | | 7/1979 | Müennich et al. | 308/216 |
| 4,270,815 A | * | 6/1981 | Olschewski et al. | 384/561 |
| 4,336,971 A | * | 6/1982 | Reiter | 384/484 |
| 5,080,502 A | * | 1/1992 | Diedrich | 384/564 |
| 5,237,748 A | * | 8/1993 | Glinski | 384/561 |

FOREIGN PATENT DOCUMENTS

| | | |
|---|---|---|
| DE | 34 11 223 A1 | 10/1985 |
| FR | 1 491 128 A | 8/1967 |

* cited by examiner

BEARING RING FOR A RADIAL ROLLING BEARING, IN PARTICULAR FOR A CYLINDRICAL ROLLER BEARING OR A NEEDLE ROLLER BEARING

This application is a National Phase of PCT Application No. EP2012/051869 filed Feb. 3, 2012, which in turn claims benefit of German Patent Application No. 10 2011 075 157.2 filed May 3, 2011.

FIELD OF THE INVENTION

The invention concerns a bearing ring for a radial rolling bearing which comprises on one of its radial shell surfaces, a raceway for a set of full complement cylindrical rolling elements or cylindrical rolling elements guided by a cage, and on whose axial front end surfaces, one or two guide flanges which axially borders/border the raceway for the rolling element is/are fixed by adhesive bonding, the invention being realisable in particular and advantageously on bearing rings for cylindrical roller bearings or needle roller bearings.

BACKGROUND OF THE INVENTION

It is common knowledge in the field of rolling bearing technology that the flanges on the bearing rings of cylindrical or needle roller bearings serve, as a rule, as an axial guidance for the rolling elements that roll on the shell surfaces of the bearing rings. Normally, these flanges are configured in one piece with the bearing rings and are made by a machining of the bearing ring. In addition, it is also well-known for a long time that flanges can be made as separate components and then fixed on the bearing ring by welding, soldering or even by adhesive bonding.

A generic rolling bearing race ring with adhesively bonded guide flanges is known for example from the document DE 41 33 442 A1. In this rolling bearing race ring, the guide flanges configured with flat lateral surfaces are supported directly on the rolling bearing race ring through a collar adjoining the rolling elements, and a circular gap for receiving the adhesive adjoins the periphery of the collar turned away from the rolling elements.

In a further rolling bearing ring known from the document DE 102 00 811 A1, the ring body of the bearing ring is adhesively bonded either in the region of its axial front end surfaces or in the region of its running surfaces with the respective opposing contact surfaces of two guide flanges. The front end surface or the running surface of the ring body comprises a plurality of local depressions made by displacement of material, as well as elevations surrounding these depressions, and the contact surfaces of the guide flanges bear against said elevations, so that a continuous gap for receiving an adhesive is formed between the ring body and the guide flanges.

Moreover, the document DE 76 03 570 U discloses a rolling bearing race ring comprising guide flanges adhesively bonded thereon, which are fixed with the help of an intermediate adhesive foil out of dispersion hardening, cross-linking resins such as phenolic resin or melamine resin on which the ring body comprising the raceway is fixed.

The main drawback of all the aforesaid known adhesively bonded joints between the guide flanges and the bearing rings is, however, that neither the bearing rings nor the guide flanges comprise any means whatever for a defined positioning of the two parts relative to each other, so that, to avoid a slipping of the guide flanges out of their exact position till the adhesive has hardened out, the guide flanges have to be fixed in position on the bearing ring by separate auxiliary devices. In addition, in the case of the first two aforesaid embodiments of adhesively bonded joints, there exists the danger of superfluous adhesive being displaced onto the raceway of the rolling elements and, in its hardened state, this adhesive obstructs a flawless functioning of the rolling bearing.

OBJECT OF THE INVENTION

Starting from the aforesaid drawbacks of the known prior art, the object of the invention is therefore to conceive a bearing ring for a radial rolling bearing, in particular for a cylindrical roller bearing or a needle roller bearing in which the guide flanges have a defined positional fixing on the bearing ring when adhesively bonded thereto and a displacement of superfluous adhesive onto the raceway of the rolling elements is excluded.

DESCRIPTION OF THE INVENTION

The above object is achieved according to the invention with a bearing ring made in accordance with the preamble of claim 1 by the fact that each guide flange comprises a rectangular profile cross-section with a horizontal fixing arm and a vertical flange arm, each guide flange being adhesively bonded with its horizontal fixing arm in a respective continuous axial groove in an axial front end surface of the bearing ring, the width of each axial groove being greater than the material thickness of each fixing arm and each guide flange being able to be fixed radially in position in the respective axial groove through a profiling of its fixing arm that is in contact both with the outer wall and with the inner wall of the associated axial groove.

Preferred embodiments and advantageous developments of the bearing ring according to the invention will be described in the dependent claims.

According to claim 2, in the bearing ring configured according to the invention, both the fixing arm and the flange arm of each guide flange possesses the shape of a regular n-cornered polygon, each fixing arm being fixed with the polygon corners on the outer wall of the axial groove and with the centres of the polygon sides on the inner wall of the axial groove. The configuration of each guide flange as an n-cornered polygon in its overall shape has proved to be the most economical method with regard to the costs of the tools for its preferred non-machining manufacturing by deep drawing. However, it is also possible to configure the free radial edge of the flange arm as usual with a circular shape. It is likewise possible, in place of the polygonal configuration of the fixing arm to make this with a sinusoidal wavy shape so that the fixing arm can be fixed with its wave crests on the outer wall of the axial groove and with its wave troughs on the inner wall of the axial groove.

According to claim 3, a further feature of the bearing ring configured according to the invention is that the number of the polygon corners of the guide flanges can be defined as a function of their material thickness and of the size of the bearing ring as also as a function of the diameters of the outer walls and the inner walls of the axial grooves in the axial front end surfaces of the bearing ring, which diameters define the circumscribed circle and the inscribed circle of the polygon. Thus, a relatively wide axial groove and a smaller material thickness of the guide flange enable a polygonal shape with less polygon corners whereas a narrow axial groove and a larger material thickness of the guide flange necessitates an appropriate multi-cornered polygonal shape. Because a relatively wide axial groove in the axial front end surfaces of the bearing ring, however, likewise necessitates an appropriate material thickness of the bearing ring, such a groove can only be made in correspondingly large bearing rings so that, in this case, as also in most other cases, a natural lower limit is set for the minimum number of polygon corners.

Moreover, according to claim 4, the bearing ring configured according to the invention is further characterized by the fact that the continuous axial groove in one or both of the axial front end surfaces of the bearing ring has a greater depth than the length of the fixing arm of each guide flange, and each guide flange can be axially fixed in the axial groove through an abutment of its flange arm on one of the axial front end surfaces of the bearing ring. The fixing arm of each guide flange therefore protrudes freely into the respective axial groove in the front end surface of the bearing ring so that its rear-side end surface provides a further bonding surface that contributes to an enhancement of the strength of adhesive bond. In addition, an advantage of the direct abutment of the flange arm on the axial front end surface of the bearing ring consists in the fact that, given a precise manufacturing of the bearing ring width, no fluctuations whatever of the axial guide clearance for the rolling elements due to variations in the thickness of the adhesive layers, as known from the prior art, can occur anymore.

Moreover, according to claim 5, in an advantageous development of the bearing ring configured according to the invention, for supporting axial forces occurring during the operation of the bearing due to the adhesively bonded guide flanges, the fixing arm of each guide flange has a length corresponding to at least 0.125 to 0.2 times the outer diameter of the flange arm of each guide flange. Purely arithmetically, the value of the length of the fixing arm between one eighth and one fifth of the outer diameter of the flange arm has proved to be optimal for normally occurring axial forces but, in the case of higher or lower axial forces, this does not exclude, in deviation from the optimum, to make the fixing arm longer or shorter and to appropriately modify the depth of the axial groove in the front end surface of the bearing ring.

Finally, as an advantageous embodiment of the bearing ring configured according to the invention, it is further proposed in claim 6 to fill all free spaces within the axial grooves in the axial front end surfaces of the bearing ring completely with an adhesive, preferably out of the group of the two-component adhesives or out of the group of the anaerobic adhesives, which adhesive is optionally mixed with a globular filling material, for example titanium oxide or aluminium powder. Two-component adhesives are characterised by good resistance against ageing and high strength at temperatures up to 100° C., whereas anaerobic, single component adhesives are suitable for use at temperatures between −60° C. and +150° C. and are characterised by freedom from solvents, adjustability of their strength and dispersion hardening properties through contact with metals in the absence of air oxygen at room temperature.

To sum up, the bearing ring configured according to the invention as compared to the prior art bearing rings thus has the advantage that, through a profiling on the fixing arm and through an axial groove in the axial front end surfaces of the bearing ring, the guide flanges of the bearing ring of the invention configured with a rectangular profile cross-section can be fixed exactly in position both in radial and in axial direction relative to each other already before being adhesively bonded on the bearing ring. As a result, the guide flanges cannot slip any longer out of their exact position till the adhesive has hardened out and the additional measures in the form of separate auxiliary devices are no longer required for this purpose. Moreover, by reason of the arrangement of the axial grooves on the front end surfaces of the bearing ring, there is no longer the danger of superfluous adhesive being displaced onto the raceway of the rolling elements and of an obstruction of a flawless functioning of the rolling bearing in the hardened state of the adhesive. For the sake of completeness, it may be mentioned that the described adhesive bonding of the guide flanges configured according to the invention on the bearing ring functions even if, in place of the axial grooves in the axial front end surfaces of the bearing ring, merely two shoulders are worked into the edge of the outer shell surface of the bearing ring and quasi two axial grooves opening towards the outside are thus created. Although it is true that, in this case, the guide flanges are fixed in position through their polygonal fixing arms only on the outer diameters of these shoulders and that the number of bonding surfaces between the fixing arms and the bearing ring is thus halved, this manner of fixing has still proved to be adequate enough for the axial guidance of the rolling elements.

BRIEF DESCRIPTION OF THE DRAWINGS

One preferred form of embodiment of the bearing ring configured according to the invention will be described more closely in the following with reference to the appended drawings. The drawings show.

DETAILED DESCRIPTION OF THE DRAWINGS

Figure 1:
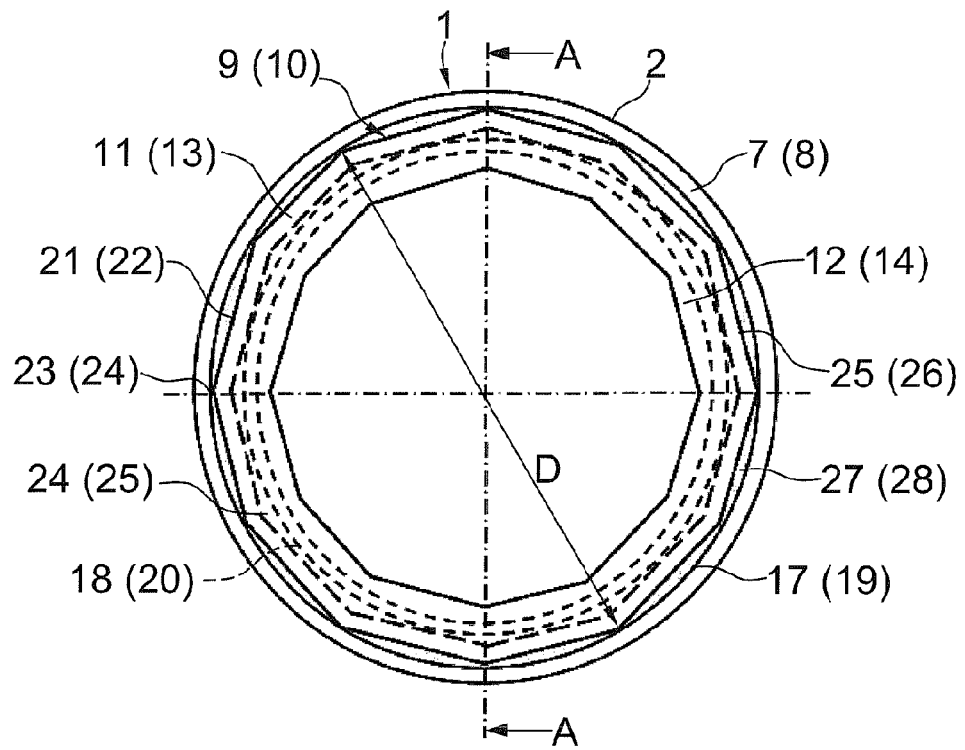
FIG. 1, a top view of a bearing ring configured according to the invention, with polygonal guide flanges.
Figure 2:
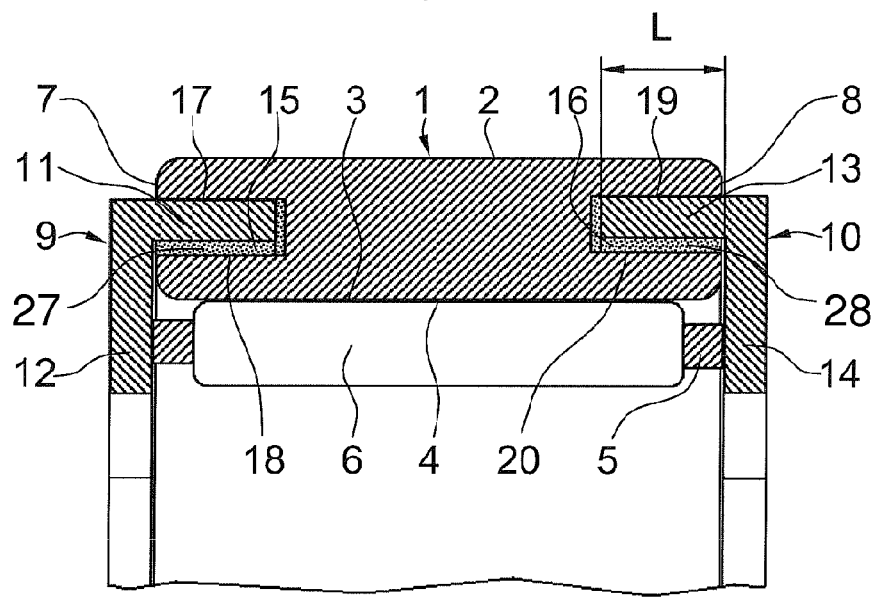
FIG. 2, an enlarged representation of the section A-A according to FIG. 1, through the bearing ring configured according to the invention.

FIGS. 1 and 2 clearly disclose an outer bearing ring 1 of a radial needle roller bearing which comprises on its radially inner shell surface 2, 3 a raceway 4 for a set of cylindrical rolling elements 6 guided through a cage 5, and on the axial front end surfaces 7, 8 of which bearing ring 1 two guide flanges 9, 10 which axially border the raceway 4 of the rolling elements 6 are fixed through adhesive bonding.

In FIG. 2 it can be seen further that, in keeping with the invention, each guide flange 9, 10 has a rectangular profile cross-section made up of a horizontal fixing arm 11, 13 and a vertical flange arm 12, 14, and that the guide flange 9, 10 is adhesively bonded with its horizontal fixing arm 11, 13 in a respective continuous axial groove 15, 16 in the axial front end surfaces 7, 8 of the bearing ring 1. It can likewise be clearly seen that the width of each axial groove 15, 16 is greater than the material thickness of each fixing arm 11, 13 and that each guide flange 9, 10 is fixed radially in position in the respective axial groove 15, 16 through a profiling 21, 22 of its fixing arm 11, 13 shown in FIG. 1, which profiling 21, 22 is in contact both with the outer wall 17, 19 and with the inner wall 18, 20 of the associated axial groove 15, 16. This profiling 15, 16 with which the flange arm 12, 14 of each guide flange 9, 10 is also clearly visibly configured possesses, for example, the shape of a regular 12-cornered polygon 21, 22, each fixing arm 11, 13 being fixed with the polygon corners 23, 24 on the outer wall 17, 19 and with the centres of the polygon sides 25, 26 on the inner wall 18, 20 of the axial groove 15, 16. The number of the polygon corners 23, 24 of the guide flanges 9, 10 is however variable and depends above all on their material thickness and on the size of the bearing ring 1 as also on the diameters of the outer walls 17, 19 and the inner walls 18, 20 of the axial grooves 15, 16 in the front end surfaces 7, 8 of the bearing ring 1, which diameters define the circumscribed circle and the inscribed circle of the polygon 21, 22.

Furthermore, it is disclosed in FIG. 2 that the continuous axial grooves 15, 16 in the two axial front end surfaces 7, 8 of the bearing ring 1 have a depth that is greater than the length L of the fixing arms 11, 13 of the guide flanges 9, 10 and that the guide flanges 9, 10, by the fact that their flange arms 12, 14 abut against the axial front end surfaces 7, 8 of the bearing ring 1 in the axial groove 15, 16, are also fixed in axial direction. As a result, if the width of the bearing ring 1 is made with precision, no fluctuations whatever of the axial guide clearance of the rolling elements 6 can occur any longer. FIG. 2, as viewed in combination with FIG. 1, likewise shows, or at least indicates that, for supporting axial forces that occur during the operation of the bearing due to the adhesively bonded guide flanges 9, 10 of the fixing arms 11, 13, each guide flange 9, 10 possesses a length L corresponding at least to 0.125 to 0.2 times the outer diameter D of the flange arm 12, 14 of each guide flange 9, 10.

From the shaded parts of FIG. 1 and the dotted parts of FIG. 2 it is further disclosed in the drawings that all free spaces 27, 28 existing within the axial grooves 15, 16 in the axial front end surfaces 7, 8 of the bearing ring 1 are completely filled with a two-component adhesive that is mixed with titanium oxide as a filling material. This adhesive is characterised by good resistance to ageing and by high strength and, for reasons of economising the costs, this adhesive is mixed with the titanium oxide in a ratio of 2 to 1.

The invention claimed is:

1. A bearing ring for a radial rolling bearing, the bearing ring comprising, on one radial shell surface of the bearing ring, a raceway for a set of full complement cylindrical rolling elements or cylindrical rolling elements guided by a cage; and, on each axial front end surface of the bearing ring, a guide flange that axially borders the raceway for the rolling elements, each guide flange being fixed by adhesive bonding, wherein
each guide flange has a rectangular profile cross-section with a horizontal fixing arm and a vertical flange arm, such that each guide flange is adhesively bonded with the horizontal fixing arm in a respective continuous axial groove in the respective axial front end surface of the bearing ring, and wherein
a width between an outer wall and an inner wall of each axial groove is greater than a material thickness, in a direction extending from the outer wall to the inner wall of each axial groove, of each fixing arm, and each guide flange may be fixed radially in position in the respective axial groove through a profiling of the fixing arm that is in contact with both the outer wall and with the inner wall of the associated axial groove.

2. The bearing ring according to claim 1, wherein both the fixing arm and the flange arm of each guide flange are shaped as a regular n-cornered polygon, n being equal to the number of polygon corners, and each fixing arm being fixed with the polygon corners on the outer wall of the axial groove and with a center of the polygon sides on the inner wall of the axial groove.

3. The bearing ring according to claim 2, wherein the number, n, of the polygon corners of the guide flanges are a function of a material thickness of the guide flanges, the size of the bearing ring, and a diameter of each of the outer wall and the inner wall of each of the axial grooves in the front end surfaces of the bearing ring, such that the diameters define a circumscribed circle and an inscribed circle of the polygon.

4. The bearing ring according to claim 1, wherein the continuous axial groove in one or both of the axial front end surfaces of the bearing ring has a greater depth than the length of the fixing arm of each guide flange, and each guide flange can be axially fixed in the respective axial groove through an abutment of the flange arm of the respective guide flange on the respective axial front end surface of the bearing ring.

5. The bearing ring according to claim 1, further comprising the radial rolling bearing, wherein said radial rolling bearing is a cylindrical roller bearing.

6. The bearing ring according to claim 1, further comprising the radial rolling bearing, wherein said radial rolling bearing is a needle roller bearing.

7. The bearing ring according to claim 1, wherein the fixing arm of each guide flange has a length corresponding to at least 0.125 times the outer diameter of the flange arm of each guide flange.

8. The bearing ring according to claim 7, wherein the fixing arm of each guide flange has a length corresponding to up to 0.2 times the outer diameter of the flange arm of each guide flange.

9. The bearing ring according to claim 1, wherein all free spaces within the axial grooves in the axial front end surfaces of the bearing ring are completely filled with an adhesive.

10. The bearing ring according to claim 9, wherein said adhesive is a two-component adhesive.

11. The bearing ring according to claim 10, wherein said adhesive is admixed with a globular filling material.

12. The bearing ring according to claim 11, wherein said globular filling material is titanium oxide or aluminium powder.

13. The bearing ring according to claim 6, wherein said adhesive is an anaerobic adhesive.

14. The bearing ring according to claim 13, wherein said adhesive is admixed with a globular filling material.

15. The bearing ring according to claim 14, wherein said globular filling material is titanium oxide or aluminium powder.

* * * * *